US007083200B2

(12) United States Patent
Falconer

(10) Patent No.: US 7,083,200 B2
(45) Date of Patent: Aug. 1, 2006

(54) FLUID ROTARY UNION

(75) Inventor: Darcy Raymond Falconer, Milford (CA)

(73) Assignee: Focal Technologies Corporation, Halifax (CA)

(*) Notice: Subject to any disclaimer, the term of this patent is extended or adjusted under 35 U.S.C. 154(b) by 52 days.

(21) Appl. No.: 10/650,627

(22) Filed: Aug. 28, 2003

(65) Prior Publication Data

US 2005/0046181 A1  Mar. 3, 2005

(51) Int. Cl.
*F16L 27/00* (2006.01)

(52) U.S. Cl. .............................. 285/121.3; 285/121.6; 285/121.1; 285/120.1

(58) Field of Classification Search ............ 285/121.3, 285/121.1, 121.6, 120.1, 96, 106
See application file for complete search history.

(56) References Cited

U.S. PATENT DOCUMENTS

| | | | | |
|---|---|---|---|---|
| 2,768,843 A * | 10/1956 | Zeilman | ................... | 285/124.1 |
| 4,111,467 A * | 9/1978 | de Fremery | ............. | 285/121.3 |
| 4,192,559 A | 3/1980 | Hewitt | | |
| 4,296,952 A | 10/1981 | McCracken | | |
| 4,444,218 A * | 4/1984 | Baugh | ..................... | 137/236.1 |
| 5,080,401 A | 1/1992 | Stich | | |
| 5,104,154 A * | 4/1992 | Shibano | ................... | 285/123.1 |
| 5,195,786 A | 3/1993 | Guardiani | | |
| 5,529,347 A * | 6/1996 | Lee | .......................... | 285/121.3 |
| 5,538,292 A | 7/1996 | Sommer | | |
| 5,577,775 A | 11/1996 | Pearson et al. | | |
| 5,582,432 A | 12/1996 | Hiestand | | |
| 5,607,189 A | 3/1997 | Howeth | | |
| 5,651,567 A | 7/1997 | Kaleniecki et al. | | |
| 5,669,636 A | 9/1997 | Kubala | | |
| 5,716,080 A | 2/1998 | Kaleniecki | | |
| 5,895,077 A * | 4/1999 | Sigmundstad | ................ | 285/96 |
| 6,029,695 A | 2/2000 | Logan | | |
| 6,145,890 A | 11/2000 | Hiestand | | |
| 6,406,065 B1 | 6/2002 | Ott et al. | | |
| 6,412,822 B1 * | 7/2002 | Omiya et al. | ............ | 285/121.3 |
| 6,485,062 B1 * | 11/2002 | Omiya et al. | ............ | 285/121.1 |
| 2002/0017785 A1 * | 2/2002 | Omiya et al. | ............ | 285/121.3 |
| 2004/0113424 A1 * | 6/2004 | Tries et al. | ............... | 285/121.3 |

FOREIGN PATENT DOCUMENTS

| | | |
|---|---|---|
| CA | 1161881 | 2/1984 |
| CA | 1255714 | 6/1989 |
| WO | 9716675 | 5/1997 |

* cited by examiner

*Primary Examiner*—James M. Hewitt
(74) *Attorney, Agent, or Firm*—Phillips Lytle LLP

(57) ABSTRACT

A fluid rotary union (FRU) includes a first member and a second member. The first member includes a plurality of spaced longitudinally directed bores of different lengths, each of which terminate at an associated radially directed bore communicating the longitudinally directed bores with an outer surface of the first member. The second member includes a first housing, a plurality of longitudinally adjacent segments and a plurality of couplers positioned between adjacent ones of the segments and the first housing and an adjacent one of the segments. Each of the segments has at least one circumferential groove formed into an inner surface for providing fluid communication with one of the associated radially directed bores of the first member. A radially directed bore extends from each of the grooves in the segment to the outer surface of the segment.

18 Claims, 7 Drawing Sheets

FLUID ROTARY UNION

BACKGROUND OF THE INVENTION

The present invention is generally directed to a fluid rotary union (FRU) and, more specifically, an FRU that is designed to operate in a relatively effective manner.

There are numerous instances in which fluids are transported from one location to another. The fluids may be gases or liquids and may be at various temperatures and pressures. Additionally, the fluids may be hazardous to man, to his environment or to the equipment used to transport the fluids. Often, especially in the oil and gas industry, it is necessary to transport a fluid from an offshore location, as at a mooring supporting a riser from a subsea wellhead, to a ship (tanker) for transfer to shore. As a ship weathervans about its mooring, it is desirable to accommodate relative rotational movement between elements in a fluid flow path, i.e., that the equipment be able to accommodate changes in orientation between adjacent conduits to minimize or prevent loss of fluid at the junctions in the flow path. In this regard, there is a need for connections that have the capability of relative movement or rotation in order to effectively transfer fluid from one conduit to another. Such connections have typically been referred to as fluid rotary unions (FRUs) or hydraulic utility swivels (HUSs).

In some situations, it is desirable to transport several fluids at a time along multiple conduits and, in certain situations, the fluid flow in at least some of the conduits needs to be bi-directional. Designing an FRU to transport several fluids at a time is generally more difficult than designing an FRU that only carries one fluid at a time. In particular, when fluids are not identical, e.g., the fluids are at different pressures and/or temperatures, the design of an FRU is relatively complex. In such designs, the FRU must accommodate fluids at different pressures and/or temperatures while still allowing for relative rotation between incoming and outgoing conduits and ensuring effective sealing with essentially no cross-contamination between the flowing fluids.

A number of prior art FRUs are disclosed in U.S. Pat. Nos. 4,192,559; 4,296,952; 5,080,401; 5,195,786; 5,538,292; 5,582,432; and 5,669,636, as well as Canadian Patent Nos. 1,161,881 and 1,255,714. Yet another FRU is disclosed in Canadian Patent Application No. 2,236,300. Each of the FRUs found in the foregoing patents or patent applications are generally designed for specific applications and may exhibit sealing problems, especially when utilized to transport fluids at high temperatures and/or pressures or when the fluids are corrosive or hazardous fluids. Further, due to the designs of these prior art FRUs, the FRUs are often difficult to repair or reconfigure.

Another FRU, developed by Focal Technologies, is shown in FIG. 1 and is referred to herein as the model 252 FRU. FRU 10 includes an inner first member or shaft 12 and a concentric outer second member 14, which is rotatable relative to the shaft 12. The shaft 12 includes a flange 16 at one end thereof for direct connection to another section of a pipe line or the like. The shaft 12 has a central axially extending through bore 18 and an annular wall 20, which surrounds the bore 18 over its length and is welded to or integrally formed with the flange 16. A plurality of longitudinally extending internal bores 22 extend along and within the annular wall 20. The bores 22 each have a different length and terminate at a different short radially directed bore 24 that communicates the bore 22 with a cylindrical outer surface 26 of the shaft 12.

The second member 14 is concentric to the shaft 12 and surrounds the shaft 12 over most of its length. Housings 28 and 30 are positioned at opposite ends of the second member 14, each being adapted for secure connection to other structures of a fluid delivery system. The housings 28 and 30 include bearings 32 and 34, respectively, which engage the shaft 12 and permit the relative rotation between the two members.

Extending between the housings 28 and 30 is a cylindrical sleeve member 36, which is securely fixed, as by annular flanges 38 and 40 and machine screws 42 and 44, to the housings 28 and 30, respectively. Positioned within and filling the annular cavity between the sleeve member 36 and the shaft 12 are a plurality of identical longitudinally adjacent annular segments 46. With reference to FIG. 1A, each segment 46 has radially extending face surfaces 48 and 50, a cylindrical outer surface 52 and a cylindrical inner surface 54. Each of the segments 46 includes a circumferentially extending central groove 56 within the inner surface 54 and a smaller cylindrical groove 58 on each side of the groove 56. A single radial bore 60 extends inwardly from the outer surface 52 of the segment 46 and communicates with the groove 56. With reference to FIG. 1D, each of the segments 46 also includes one or more radially directed drain bores 82, each of which extends from the inner surface 54 to a drain port 84 at the outer surface 52. As shown, the segments 46 include an annular groove 66 in the face surface 48 and an annular groove 68 in the other face surface 50. The grooves 66 and 68 are spaced at identical radial distances from the axis of the segment and receive a seal.

The annular segments 46 are positioned within the sleeve member 36 such that the inner surface 54 of each segment is almost in sliding contact with the outer surface 26 of the shaft 12. A circumferential seal element, which may be held by an annular clip, is positioned within each circumferential groove 58 so that the seal element itself makes sealing sliding contact with the outer surface 26. The outer surface 26 of the shaft 12 may be treated with a suitable material, such as tungsten chromium carbide, to reduce wear or galling should the inner surface 54 of one of the segments 46 come into contact with the outer surface 26 of the shaft 12. The segments 46 are positioned within the cavity between the sleeve member 36 and the shaft 12 so that the groove 56 of each segment 46 is in fluid communication with a corresponding one of the radial bores 24 provided at the termination of a bore 22 in the shaft 12 and the seal elements of the segment 46 straddle the fluid connection between the groove 56 and the radial bore 24. As mentioned above, for additional sealing between adjacent ones of the segments 46, the grooves 66 and 68 may be formed in the segments 46 and a circumferential sealing ring positioned therein so as to bridge the gap between adjacent segments at the face surfaces 48 and 50.

The sleeve member 36 has a plurality of circumferentially spaced apertures therethrough at longitudinal positions corresponding generally to the central radial plane of each of the segments 46. (See FIG. 1A). At each such plane, one of the apertures 74 is in fluid communication with the radial bore 60 of the adjacent annular segment located within the sleeve member 36. With reference to FIG. 1C, other apertures 78 contain fasteners 80, which serve to properly locate each of the annular segments 46 in its desired position within the sleeve member 36. The fasteners 80 may include, for example, a hollow plug member 88, which extends from a blind bore 90 in the segment 46 through the aperture 78, and a machine or set screw 92 that passes through the plug 88 and is received in a threaded fashion in blind bore 62.

With the annular segments 46 properly positioned within the sleeve member 36, there is a fluid path established from one of the bores 22 in the shaft 12 to one of the radial bores 24 and then to one of the grooves 56 of one of the segments 46. From the grooves 56, there is fluid communication to the outer surface via the radial bore 60 and to the exterior of the rotary union via a fluid connector that may be in fluid communication with appropriate conduits (not shown) for transporting fluid to other locations. Finally, the drain port 84 may receive a conduit that drains any fluid that may have collected within the region between the shaft 12 and the segments 46. Access to the drain port 84 is provided by way of another aperture 96, which passes through the sleeve member 36. While the above-disclosed FRUs are functional, the above-disclosed FRUs can be relatively expensive to manufacture and difficult to repair.

What is needed is a fluid rotary union (FRU) that substantially maintains the functional benefits of prior art FRUs while providing additional functions with reduced manufacturing costs.

SUMMARY OF THE INVENTION

One embodiment of the present invention is directed to a fluid rotary union (FRU) that includes a concentric first member and a second member. The concentric first member includes a plurality of spaced longitudinally directed bores of different lengths extending from at least one end of the first member. Each of the longitudinally directed bores terminates at an associated radially directed bore communicating the longitudinally directed bores with an outer surface of the first member. The second member includes a first housing, a second housing, a plurality of longitudinally adjacent segments and a plurality of couplers. The first housing is located at a first end of the second member and is rotatably interconnected with the first member. The second housing is approximate a second end of the second member and is also rotatably interconnected with the first member. The plurality of longitudinally adjacent segments are positioned between the first housing and the second housing. Each of the segments has an outer surface, an annular inner surface and at least one circumferential groove formed into the inner surface for providing fluid communication with one of the associated radially directed bores of the first member. Each of the segments includes a radially directed bore extending from each of the grooves to the outer surface of the segment. One of the plurality of couplers is positioned between adjacent ones of the segments, between the segment adjacent the first housing and the first housing and between the segment adjacent the second housing and the second housing. The first member is positioned within the second member and is rotatable relative thereto.

These and other features, advantages and objects of the present invention will be further understood and appreciated by those skilled in the art by reference to the following specification, claims and appended drawings.

DESCRIPTION OF THE PREFERRED EMBODIMENT

The present invention generally overcomes many of the problems associated with the prior art by providing a fluid rotary union (FRU) for use in a fluid delivery system that is capable of transporting multiple fluids with little or no loss of pressure or sealing problems in an economical manner. The FRU can be modified to accommodate different numbers of flow channels and is designed to ensure efficient rotation between incoming and outgoing conduit arrangements. The FRU uses a semi-independent floating design that includes a plurality of individual segments, each of which is effectively coupled to an adjacent segment or segments and/or a housing (i.e., when the segment is an end segment) using a coupler, i.e., a torque transmitting/misalignment device. Each segment contains one or more fluid channels and is capable of "floating" with a central shaft that includes a plurality of longitudinally extending bores, each of which is capable of carrying fluid. The bores terminate at different locations along the shaft, each such terminal location corresponding to an associated fluid passage within a segment. The fluid can be transported bi-directionally, i.e., in a forward or a reverse direction, along a bore and its associated segment. As described herein, the housing, couplers and the segments constitute one element of the FRU while the shaft constitutes the other element of the FRU, those elements being rotatable relative to each other.

Seals positioned in the segments seal the fluid passages to prevent cross-contamination of fluids from one segment to, for example, an adjacent segment. A surface of the shaft may be treated, e.g., with a tungsten chromium carbide, so as to act as a bearing surface. When configured in this manner, the annular segments and the shaft may act bearingly against each other. In the event that the shaft changes shape due to pressure/temperature fluctuations in the carried fluids or the shaft experiences sideways directed loads, resulting from the installation, such movements are accommodated as the segments "float" with the shaft to find their best positions. In the event that an individual segment is damaged, the FRU can be repaired with minimal difficulty by removing the damaged segment and replacing it with a new or refurbished segment. Drain ports advantageously allow for detecting, collecting and/or draining any leakage from the rotary seals.

Figure 1:
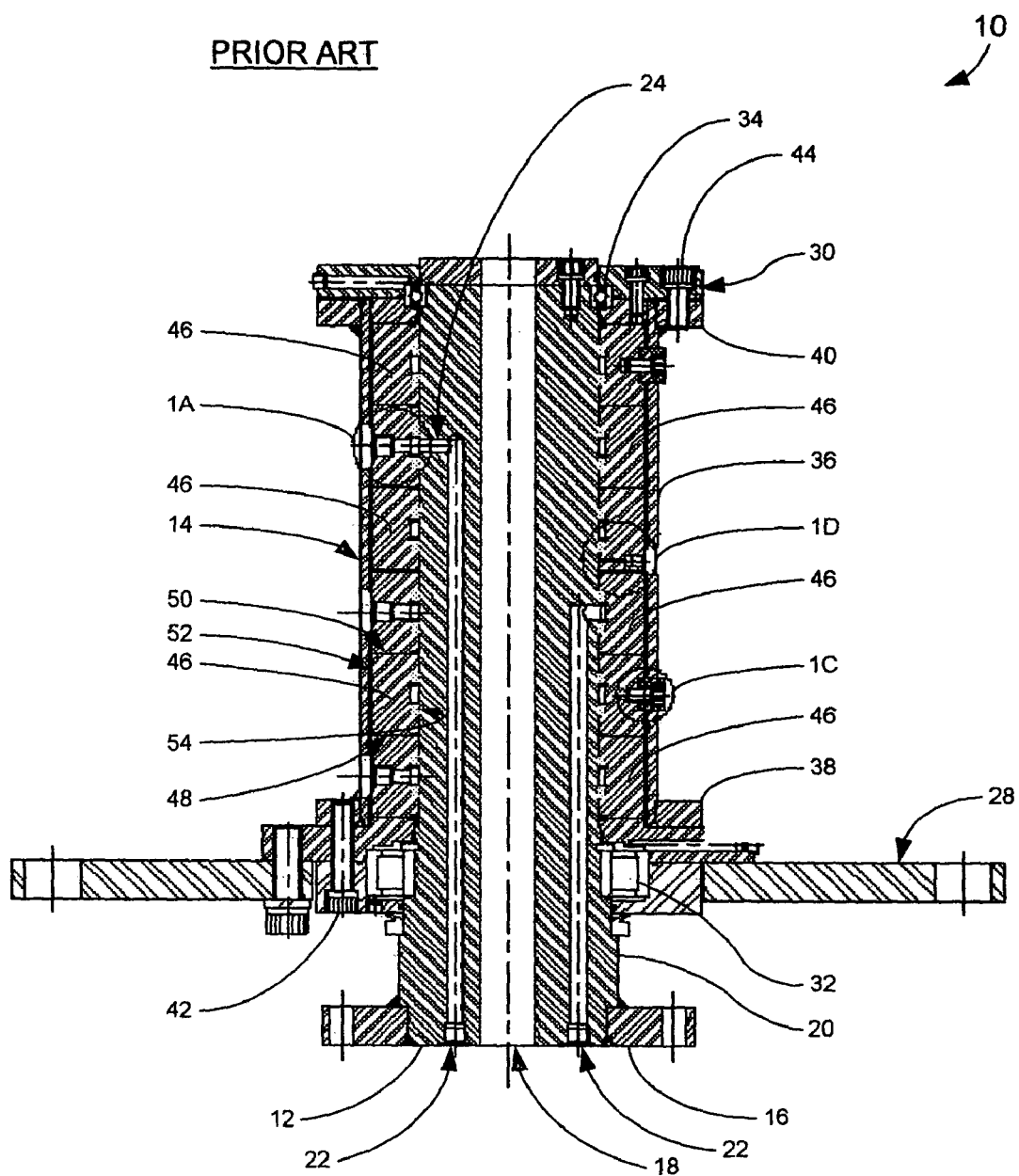
FIG. 1 is an illustrative sectional view of a prior art fluid rotary union (FRU)
Figure 1A:
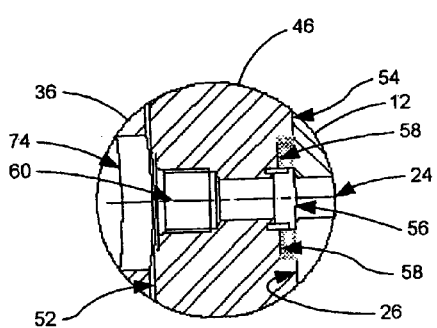
FIG. 1A is an enlarged cross-sectional view of a fluid passage junction, between an outer segment and a shaft of the FRU of FIG. 1.
Figure 1D:
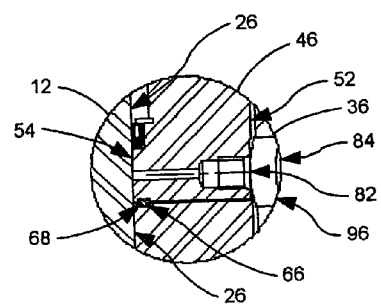
FIG. 1D is an enlarged cross-sectional view of a leak recovery port, along with a secondary seal, of the FRU of FIG. 1.
Figure 1B:
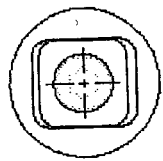
FIGS. 1B and 1C are enlarged front and cross-sectional views, respectively, of a fastener for connecting a sleeve member to an outer segment of the FRU of FIG. 1.
Figure 1C:
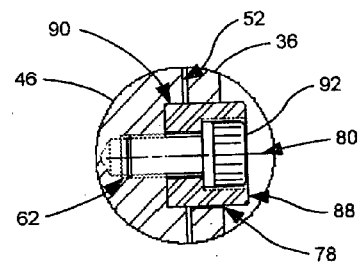
Figure 2:
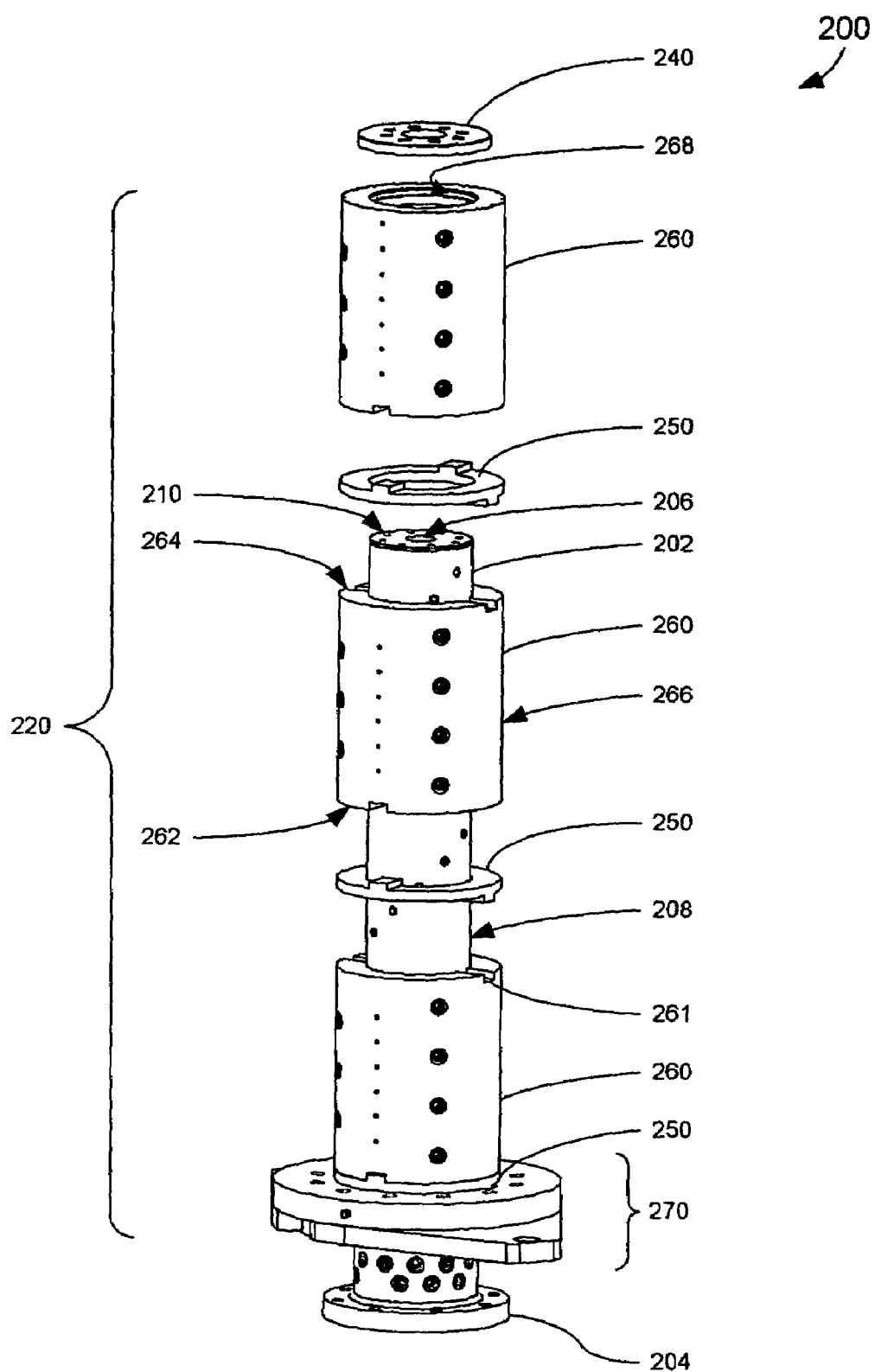
FIG. 2 is a partially exploded perspective view of an FRU in accordance with one embodiment of the present invention.
Figure 3:
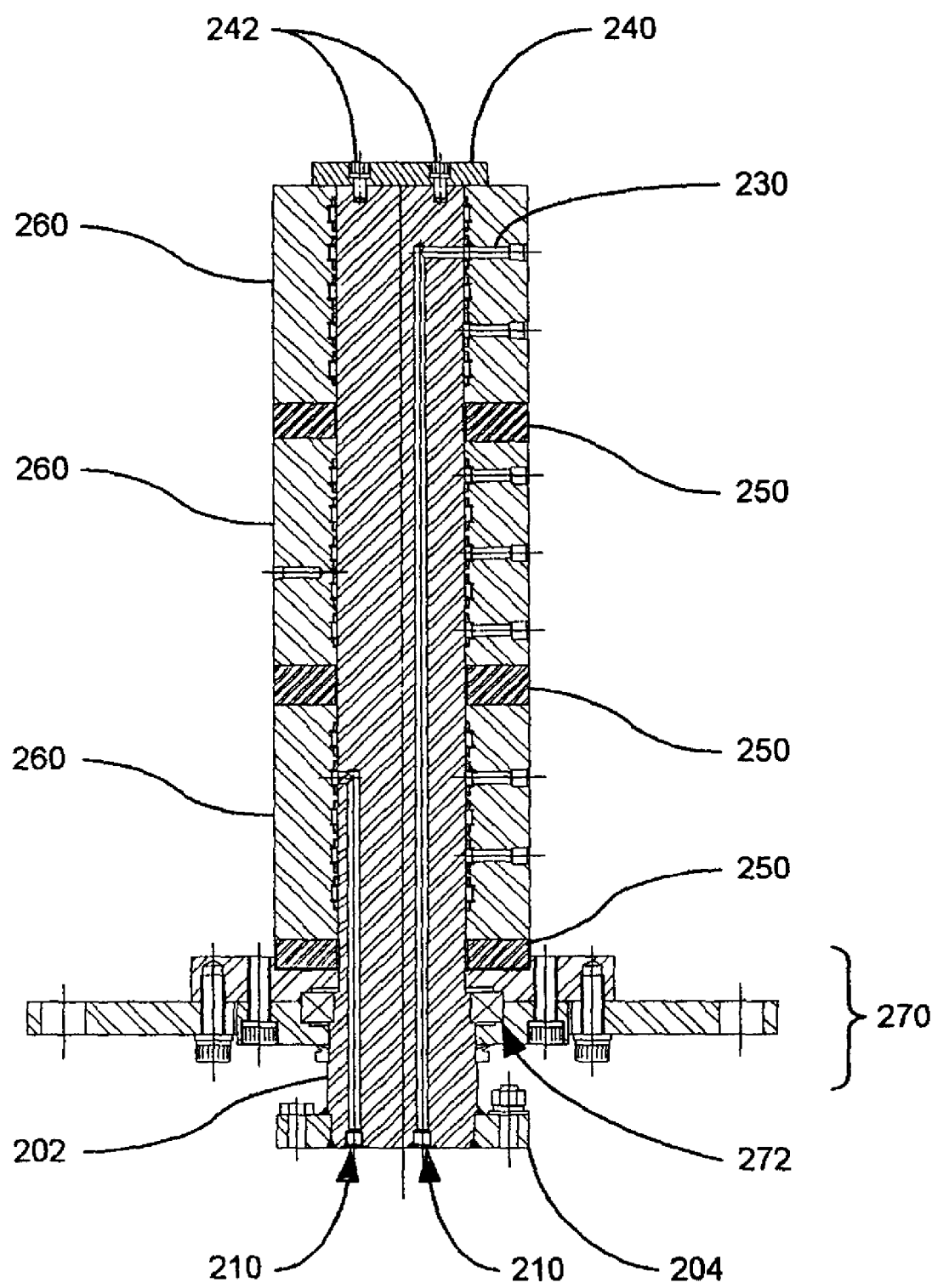
FIG. 3 is an illustrative longitudinal cross-sectional view of the FRU of FIG. 2 in an assembled state and taken on its centerline.

FIG. 2 illustrates an exemplary partially exploded perspective view of a fluid rotary joint (FRU) 200, according to one embodiment of the present invention. The FRU 200 includes an inner first member (or shaft) 202 and a concentric outer second member 220, which are rotatable relative to each other. It should be appreciated that an outer surface of the second member 220 may be other than circular. The shaft 202 includes a flange 204 at one end thereof for direct connection to another section of a pipeline or the like. The shaft 202 has an annular wall 208, which surrounds a central axially extending through bore 206 (when implemented) over its length, and is welded to or integrally formed with the flange 204. A plurality of longitudinally extending internal bores 210 extend along and within the annular wall 208. The bores 210, which may be equally circumferentially spaced relative to each other, each have a different length. The bores 210 may extend from the end provided with the flange 204 or the bores 210 may extend from an end opposite the end with the flange 204. Alternatively, the bores 210 may extend from both ends of the shaft 202 (providing the bores 210 do not run into each other). For example, a set of bores extending from the flange 204 end of the shaft 202 may be angularly offset from a set of bores extending from the end of the shaft 202 opposite the flange 204 end. With reference to FIG. 3, each of the bores 210 terminates at an associated short radially directed bore 230 that communicates the bores 210 with the outer surface of the shaft 202.

Figure 7:
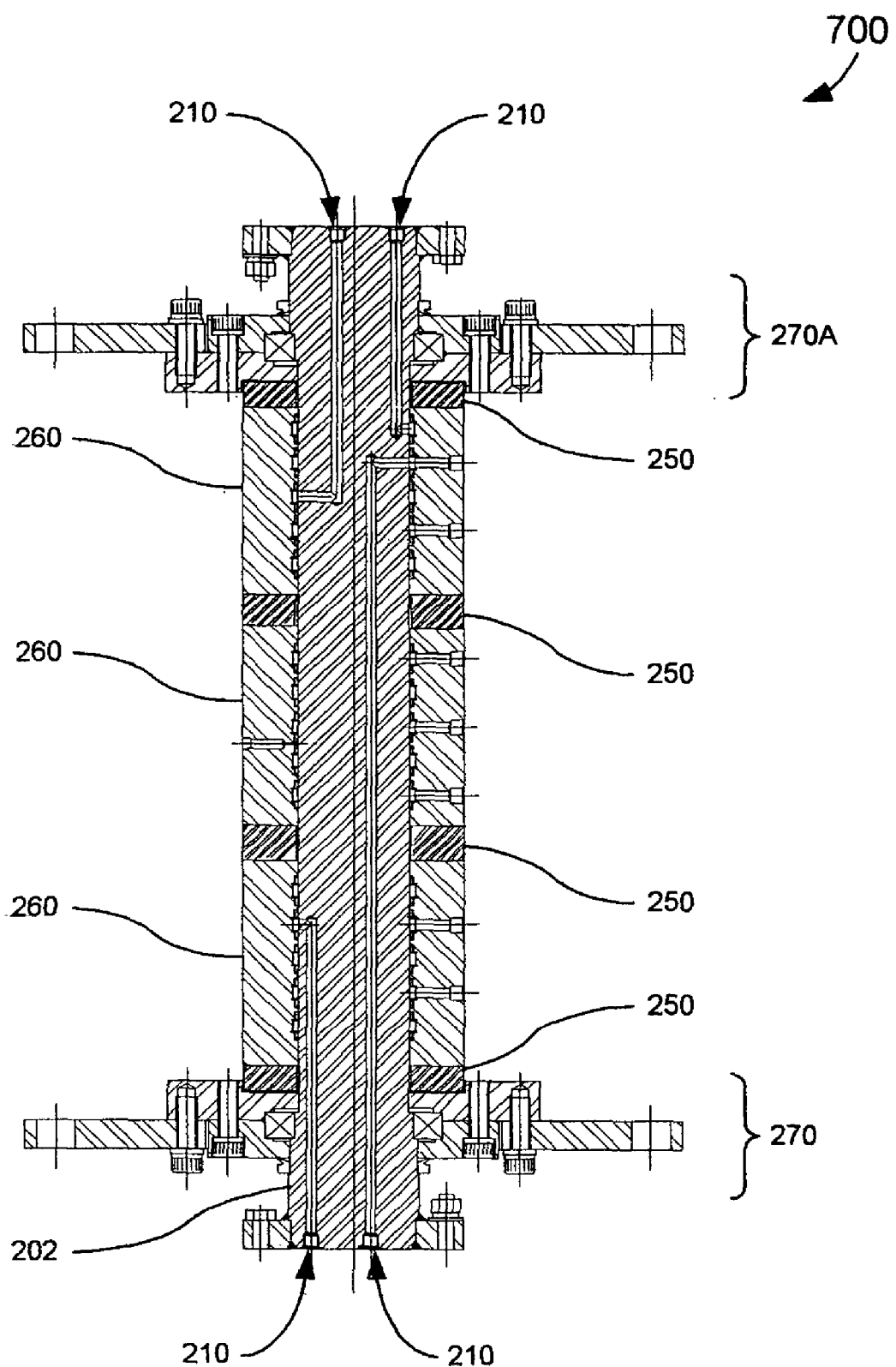
FIG. 7 is an illustrative longitudinal cross-sectional view of an FRU in accordance with another embodiment of the present invention.

The second member 220 is concentric to the shaft 202 and surrounds the shaft 202 over most of the length of the shaft 202. A first housing 270 at one end of the second member 220 is provided for securing the FRU 200 to another structure of the fluid delivery system, which is not further described herein. The housing 270 includes bearings 272 that engage the shaft 202 and permit the relative rotation between the shaft 202 and the second member 220 while restraining the shaft 202 and the second member 220 relative to each other in an axial direction. As is best shown in FIG. 3, an end plate 240 is attached to the shaft 202 with fasteners 242. The end plate 240 restricts axial movement of a plurality of longitudinally adjacent annular segments 260. Alternatively, as is shown in FIG. 7, a second housing 270A may be implemented in place of the end plate 240.

Figure 4:
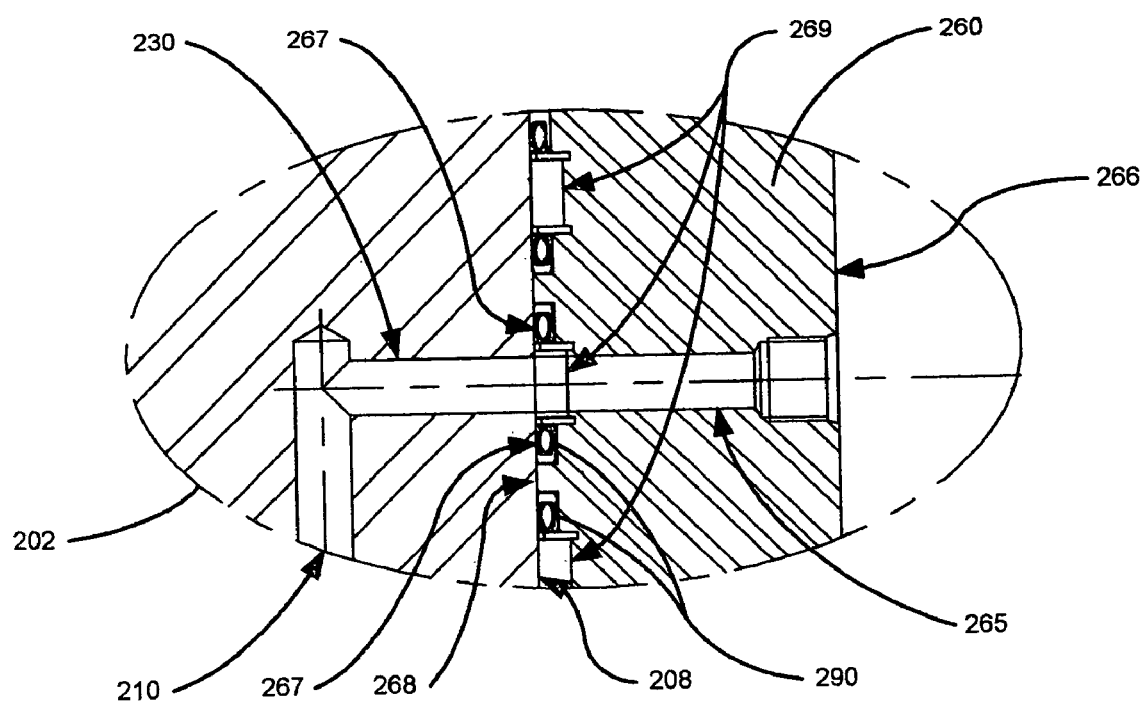
FIG. 4 is an expanded cross-sectional view from FIG. 3 showing a junction between an outer segment and a shaft at an outlet port.
Figure 5:
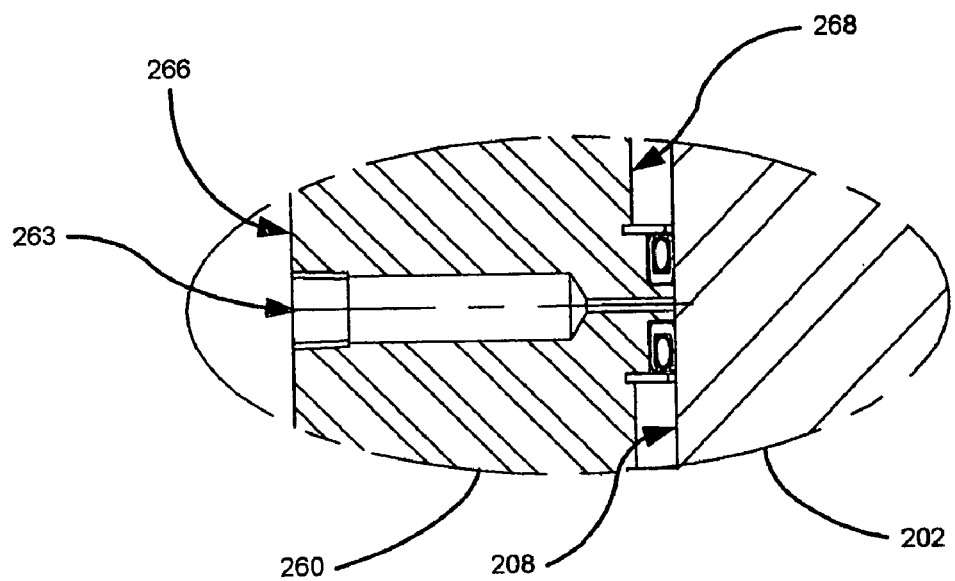
FIG. 5 is an expanded cross-sectional view from FIG. 3 showing the junction between an outer segment and the shaft at a drain port.
Figure 6:
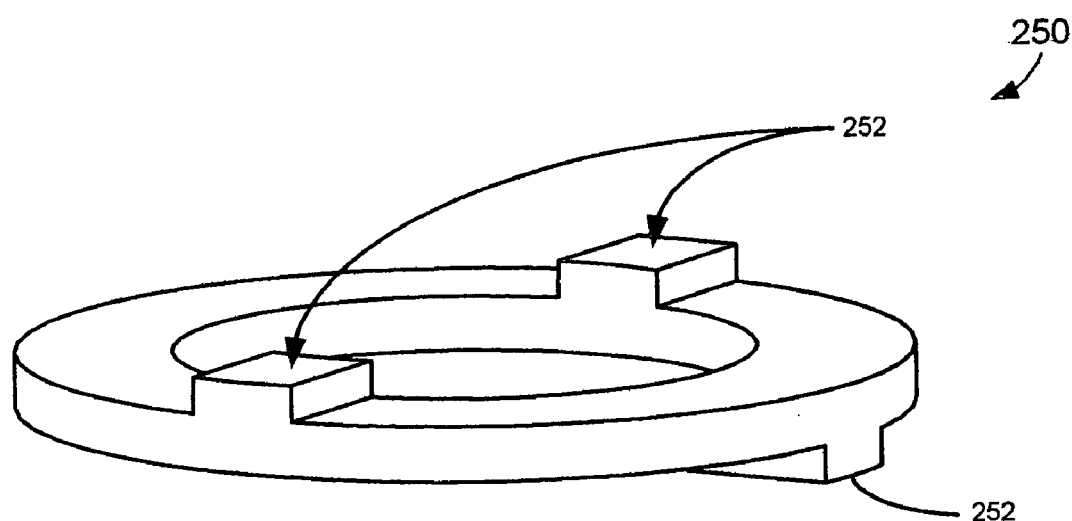
FIG. 6 is a perspective view showing an exemplary coupler used to transmit torque and/or misalignment of the outer segments.

Extending between the housing 270 and the end plate 240 are the segments 260 and couplers 250. As is best shown in FIG. 2, each of the segments 260 has radially extending face surfaces 262 and 264, a cylindrical outer surface 266 and a cylindrical inner surface 268. With reference to FIG. 4, one or more circumferentially extending grooves 269 are formed in the inner surface 268 of each segment 260 and a smaller cylindrical groove 267 is formed on both sides of each of the grooves 269. Radial bores 265 extend inwardly from the outer surface 266 of the segments 260 and communicate with an associated one of the grooves 269. Each of the radially extending faces 262 and 264 include slots 261 for engagement with lugs 252 of one of the couplers 250. As is best shown in FIG. 6, the coupler 250 includes lugs 252 integrally formed on opposite sides of the coupler 250 for engaging the slots 261 in the segments 260. As is shown in FIG. 6, the lugs 252 on opposite sides of the coupler 250 may be orthogonally positioned. The couplers 250 support the segments 260 axially, transmit torque between components of the FRU 200 and allow for some misalignment between the components. With reference to FIG. 5, each of the segments 260 may also include one or more radially directed drain bores 263, each of which extends from the inner surface 268 to the outer surface 266. Optionally, the segments 260 may be provided with secondary cylindrical grooves in the inner surface 268 spaced axially outward from the grooves 269.

As is best shown in FIGS. 2 and 3, the segments 260 are positioned such that the inner surface 268 of each of the segments 260 is in transient sliding contact with the outer surface of the shaft 202. Circumferential seals 290 (see FIG. 4) are positioned within each of the grooves 267 so that the seals make sealing sliding contact with the outer surface of the shaft 202. The seals 290 may be held in place through any number of techniques, e.g., by an annular clip. The outer surface 208 of the shaft 202 may be treated with a suitable material, such as tungsten chromium carbide, to reduce wear or galling should the inner surface 268 of one of the segments 260 come into contact with the outer surface 208 of the shaft 202. The segments 260 are positioned so that the grooves 269 of each of the segments 260 are in fluid communication with a corresponding one of the radial bores 230 formed in the shaft 202. The seals 290 straddle the fluid connection between the grooves 269 and the radial bore 265. As described above, if additional sealing is required, then an appropriate circumferential seal element may be positioned within an optional secondary groove so that such seal element will also be in sliding sealing contact with the outer surface of the shaft 202.

With the annular segments 260 properly positioned between the housing 270 and end plate 240, fluid paths are established from the bores 210 in the shaft to one of the radial bores 230 and then to one of the grooves 269 of one of the corresponding segments 260. Each of the grooves 269 is in fluid communication with the outer surface 266 of one of the segments 260, via the radial bores 265. Fluid communication to appropriate conduits (not shown) for transporting fluid to other locations is achieved by coupling one of the conduits to the radial bores 265. Although the fluid flow is described herein as being in a direction from the flange 204 end of the shaft 202 to the end plate 240 end of the FRU 200, it should be appreciated that fluid flow can readily be achieved in the opposite direction. Furthermore, as the FRU 200 includes a plurality of flow paths, there can be simultaneously fluid flow in both directions, for example, alternate ones of the flow paths may transport fluid in opposite directions.

Finally, with reference again to FIG. 5, the drain port 263 may also be configured to receive a conduit that drains any fluid that may have collected within the region between the shaft 202 and one of the segments 260. This is particularly advantageous in the event that the outer surface 208 of the shaft 202 and/or the inner surface 268 of one or more of the segments 260 and/or one of the seals 290 experiences unusual wear.

In summary, the fluid rotary unions (FRUs), described herein, represent an improvement over FRUs in that they are readily repairable, permit flow in either direction or in both directions simultaneously, readily provide for the collection of rotary seal leakage, reduce problems occasioned by wear and thermal gradients and minimize the use of costly components.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A multiple-pass fluid rotary union, comprising:
a first member including a plurality of spaced longitudinally directed bores of different lengths extending from one end of the first member and terminating at an associated radially directed bore communicating the longitudinally directed bores with an outer surface of the first member; and
a second member including:
a housing positioned adjacent to a first end of the second member, and rotatably connected with the first member;
an end plate positioned adjacent to a second end of the second member, and operably connected with the first member;
a plurality of longitudinally adjacent segments positioned between the housing and the end plate, wherein each of the segments has opposite end surfaces, an outer surface, an annular inner surface with at least one circumferential groove therein for providing fluid communication with one of the associated radially directed bores of the first member, and a radially directed bore extending from each of the grooves to the outer surface of the segment; and
a plurality of couplers having ungrooved inner surfaces without fluid communication with the radially directed bores of the first member, and opposite faces which abuttingly engage the end surfaces of the segments to transmit torque between the segments without rigid connection therebetween, and thereby accommodate for some misalignment between the segments, wherein the couplers are positioned between adjacent ones of the segments, and wherein the first member is positioned concentrically within the second member and is rotatable relative thereto.

2. The union of claim 1, wherein the segments and the couplers are captured in a stacked relationship between the housing and the end plate.

3. The union of claim 1, including a seal positioned between the annular inner surface of each of the segments and the outer surface of the first member.

4. The union of claim 3, wherein the seal includes a circumferential seal element in the annular inner surface of each of the segments on each side of the grooves thereof in sealing engagement with the outer surface of the first member.

5. The union of claim 1, including radially directed passages located between the grooves and providing for at least one of rotary seal leakage detection, collection and drainage.

6. The union of claim 1, wherein the outer surface of the first member includes a wear resistant coating and wherein the first member acts bearingly against the segments.

7. The union of claim 1, further including:
a secondary seal positioned between each of the annular segments and the first member.

8. The, union of claim 1, wherein one end face of each segment has a slot and wherein the facing end face of the adjacent coupler has a lug received in said slot to rotatably connect the same.

9. The union of claim 8, wherein a wear resistant surface treatment is applied to at least one of the couplers.

10. A multiple-pass fluid rotary union, comprising:
a first member including a plurality of spaced longitudinally directed bores of different lengths extending from one end of the first member, and terminating at an associated radially directed bore communicating the longitudinally directed bores with an outer surface of the first member; and
a second member including:
a housing positioned adjacent to a first end of the second member, and rotatably connected with the first member;
a retainer positioned adjacent to a second end of the second member, and being operably connected with the first member;
a plurality of longitudinally adjacent segments positioned between first housing and the retainer, wherein each of the segments has opposite end surfaces, an outer surface, an annular inner surface with at least one circumferential groove therein for providing fluid communication with one of the associated radially directed bores of the first member, and a radially directed bore extending from each of the grooves to the outer surface of the segment; and
a plurality of couplers having ungrooved inner surfaces without fluid communication with the radially directed bores of the first member, and opposite faces which abuttingly engage the end surfaces of the segments to transmit torque between the segments without rigid connection therebetween, and thereby accommodating for some misalignment between the segments, wherein the couplers are positioned between adjacent ones of the segments, and wherein the first member is positioned concentrically within the second member and is rotatable relative thereto.

11. The union of claim 10, wherein the segments and the couplers are captured in a stacked relationship between the housing and the retainer.

12. The union of claim 10, including a seal positioned between the annular inner surface of each of the segments and the outer surface of the first member.

13. The union of claim 12, wherein the seal includes a circumferential seal element in the annular inner surface of each of the segments on each side of the grooves thereof in sealing engagement with the outer surface of the first member.

14. The union of claim 1, including radially directed passages located between the grooves and providing for at least one of rotary seal leakage detection, collection and drainage.

15. The union of claim 1, wherein the outer surface of the first member includes a wear resistant coating and wherein the first member acts bearingly against the segments.

16. The union of claim 1, further including:
a secondary seal positioned between each of the annular segments and the first member.

17. The union of claim 1, wherein the one end face of each segment has a slot and wherein the facing end face of the adjacent coupler has a lug received in said slot to rotatably connect the same.

18. The union of claim 17, wherein a wear resistant surface treatment is applied to at least one of the couplers.

* * * * *